United States Patent [19]

Pithouse

[11] 4,413,656
[45] Nov. 8, 1983

[54] WRAP-AROUND DEVICE

[75] Inventor: Kenneth B. Pithouse, Wiltshire, England

[73] Assignee: Raychem Limited, London, England

[21] Appl. No.: 296,278

[22] Filed: Aug. 26, 1981

[30] Foreign Application Priority Data

Sep. 13, 1980 [GB] United Kingdom ............... 8029661

[51] Int. Cl.³ .............................................. F16L 57/00
[52] U.S. Cl. ............................ 138/110; 174/DIG. 8;
428/36; 428/194; 428/913
[58] Field of Search .................... 138/118.1, 128, 151,
138/156, 163, 170, 171, DIG. 1; 156/85, 86;
174/92, DIG. 8; 264/230, 342 R; 428/36, 194,
913; 285/381, DIG. 16

[56] References Cited

U.S. PATENT DOCUMENTS

| | | | |
|---|---|---|---|
| 3,959,052 | 5/1976 | Stanek | 156/86 |
| 4,181,775 | 1/1980 | Corke | 174/DIG. 8 X |
| 4,197,880 | 4/1980 | Cordia | 138/99 |
| 4,200,676 | 4/1980 | Caponigro | 428/57 |
| 4,219,051 | 8/1980 | D'Haeyer | 138/178 |
| 4,283,239 | 8/1981 | Corke et al. | 156/85 |
| 4,379,473 | 5/1983 | Kunze | 138/99 X |

FOREIGN PATENT DOCUMENTS

| | | |
|---|---|---|
| 1904641 | 11/1979 | Fed. Rep. of Germany . |
| 54-159722 | 12/1979 | Japan ......................... 174/DIG. 8 |
| 990235 | 4/1965 | United Kingdom . |
| 1010064 | 11/1965 | United Kingdom . |
| 1284082 | 8/1972 | United Kingdom . |
| 1294665 | 11/1972 | United Kingdom . |
| 1359196 | 7/1974 | United Kingdom . |
| 2019112A | 10/1979 | United Kingdom . |
| 2044561A | 10/1980 | United Kingdom . |
| 2018527 | 11/1982 | United Kingdom . |
| 2023021 | 1/1983 | United Kingdom . |

*Primary Examiner*—Stephen Marcus
*Assistant Examiner*—Mark Thronson
*Attorney, Agent, or Firm*—Herbert G. Burkard; Edith A. Rice

[57] ABSTRACT

A wrap-around device for enclosing at least part of an elongate substrate such as a pipe comprises a dimensionally-recoverable cover, preferably a dimensionally heat-recoverable cover, having an adhesive closure arrangement comprising two closure portions which can be brought into abutment to form an adhesive bond but which, when pulled in a direction away from each other after the adhesive bond has been formed, will change in configuration to form a lap joint.

The device according to the invention enables an adhesive wrap-around device to be installed about a substrate in a simple manner without the possibility of misalignment of the closure portions.

12 Claims, 13 Drawing Figures

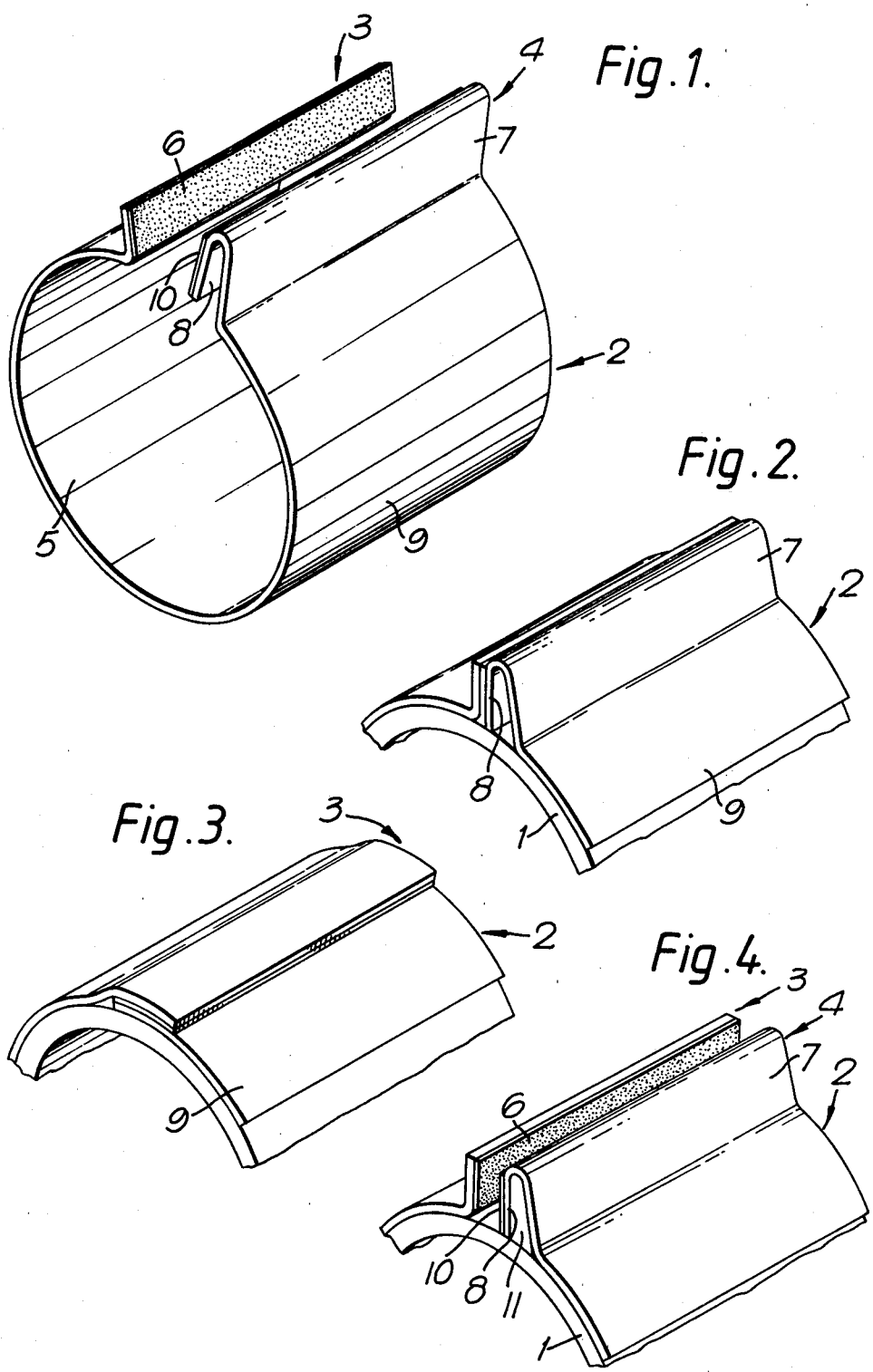

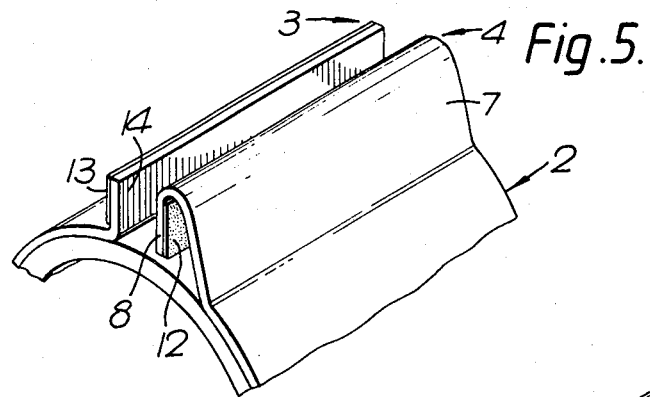
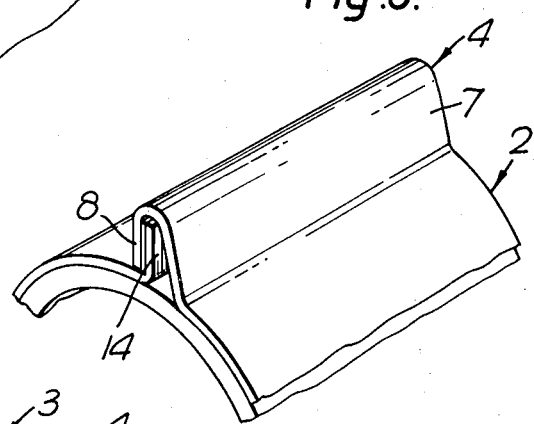
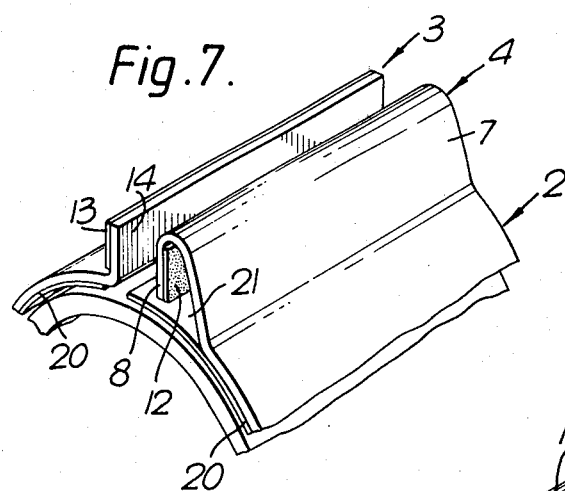
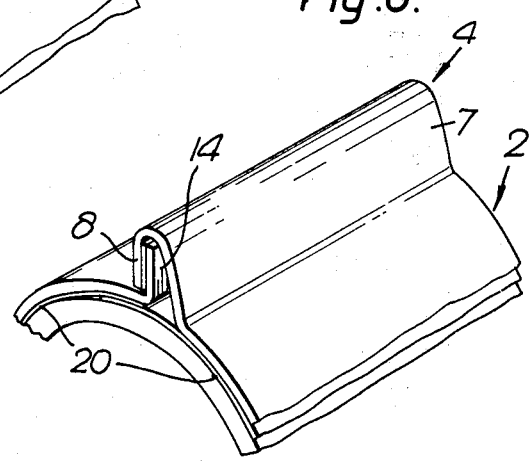

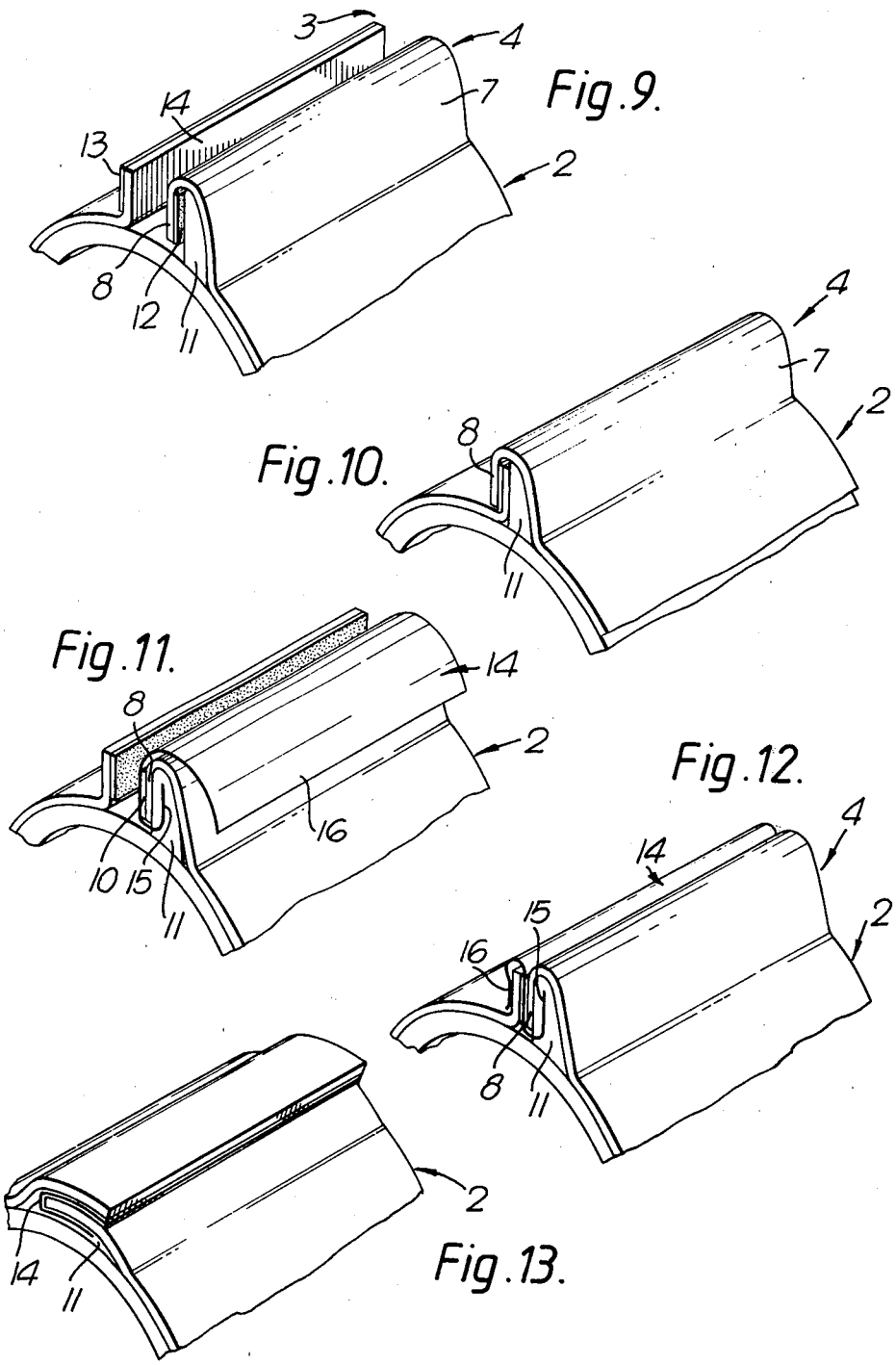

WRAP-AROUND DEVICE

BACKGROUND OF THE INVENTION

This invention relates to devices for enclosing objects, especially, although not necessarily, for enclosing elongate objects, for example, pipes and cables.

It is often desirable to enclose objects, and especially elongate objects such as pipes and cables, in a cover, for example in order to protect the object from the environment or from mechanical abuse. Of particular interest are those devices that are dimensionally recoverable and can be installed at any point on the object without requiring access to its end. Such devices are commonly known as wrap-around devices. One form of wrap-around device that has been used extensively for a number of years is described in U.S. Patent Specification No. 3,455,336, the disclosure of which is incorporated herein by reference. This wrap-around device has a mechanical closure arrangement in which the closure portions of the cover are provided with axially extending ridges which together form a rail over which a metal channel can be positioned to retain the edge portions together. Wrap-around devices having adhesive closure arrangements have also been proposed in which the closure portions of the cover are provided with a layer of contact or pressure sensitive adhesive so that one closure portion can be placed over the other closure portion to form a lap joint along the length of the device. A major problem that has been encountered with wrap-around devices having adhesive closure arrangements is that it is very difficult to ensure that the closure portions are correctly aligned, especially where the wrap-around device can exceed one meter in length, since the installer must retain one closure portion on the object so that it does not move while, at the same time, positioning the other closure portion over it and then pressing the two together. A large degree of misalignment will cause the closure portions to buckle or be forced apart on recovery of the wrap-around device, while a small degree of misalignment may cause buckling which is undetectable but which will allow passage of fluid through the bond and so render the device ineffective. It will be appreciated that any misalignment cannot be corrected once any part of the closure portions have contacted each other.

SUMMARY OF THE INVENTION

The present invention provides a wrap-around device for enclosing at least part of an elongate substrate, which comprises a dimensionally-recoverable cover having an adhesive closure arrangement comprising two closure portions which can be brought into abutment to form an adhesive bond but which, after the adhesive bond has been formed, will change in configuration to form a lap joint by recovery of the cover about the substrate.

The closure portions, which are preferably located at, or adjacent to, the edges of the cover of the wrap-around device, may be arranged so that an adhesive bond is formed immediately on abutment of the closure portions or only after one or more other operations have been performed.

Preferably a first of the said closure portions of the wrap-around device is in the form of a flange-like projection extending away from the intended position of the substrate; and a second of the said closure portions has a first wall extending from the cover away from the intended position of the substrate and is bent or folded at the apex of the closure portion to form a second wall extending toward the intended position of the substrate; one surface of the projection and/or of the second wall being coated with a layer of adhesive to form the said adhesive bond when the closure portions have been brought into abutment, and the walls being capable of opening out when the closure portions are pulled in a direction away from each other. In this form of device the closure portions are preferably arranged so that they will be bonded together initially in a plane extending outwardly from the substrate, so that when the cover is caused to recover, contraction of the cover about the substrate will pull the closure portions and cause them to change in configuration to form a lap joint.

The adhesive may be located on the surface of the projection forming the first closure portion corresponding to the under surface of the cover and/or on the surface of the second wall of the second closure portion corresponding to the outer surface of the cover so that the closure portions are bonded together immediately they are brought into abutment and the first closure portion will overlie the second closure portion in the resulting lap joint.

In an alternative arrangement, the adhesive may be located on the surface of the projection forming the first closure portion corresponding to the outer surface of the cover and/or on the surface of the second wall of the second closure portion corresponding to the under surface of the cover so that, before the closure portions have been brought together, the coated surfaces face away from each other, and, in the resulting lap joint, the second wall of the closure portion overlies the first closure portion. Although this form of device has the slight disadvantage that it is necessary, initially to pull back one wall of the second closure portion and, when the first closure portion has been positioned, to press that wall against the first closure portion, it has the advantage that the arrangement of end portions will reduce any forces acting on the adhesive bond that may cause it to peel open. A further advantage of this arrangement is that, because the surfaces of the closure portions that are initially brought into abutment do not adhere to each other, any slight misalignment of the closure portions can be corrected before the adhesive bond is formed. In either arrangement, the only bond that is formed is the bond that forms the resulting lap joint, i.e. no bond is caused to fail during recovery of the cover.

Thus, according to a preferred aspect, the invention provides a wrap-around device for enclosing at least part of an elongate substrate, which comprises:
  a dimensionally-recoverable cover having an under surface to be positioned about the substrate, an outer surface, and an adhesive closure arrangement comprising two closure portions which can be brought into abutment to form a single adhesive bond between the closure portions;
  a first of the said closure portions being in the form of a flange-like projection extending away from the intended position of the substrate; and
  a second of the said closure portions having a first wall that extends from the cover away from the intended position of the substrate and is bent or folded to form a second wall extending toward the intended position of the substrate; the surface of the flange-like projection corresponding to the outer surface of the cover and/or the surface of the second wall corresponding to the under surface of the cover being coated with a layer of adhesive which will form the said single adhesive bond immediately the projection and the second wall are brought into contact, the surface of the flange-like projection and of the first wall that correspond to the under surface of the cover being free of adhesive, and the first and second walls being capable of opening out by recovery of the cover after the adhesive bond has been formed, to form a lap joint in which the second wall overlies the first closure portion and is bonded thereto by the entire said single adhesive bond.

The term "lap joint" as used herein includes any joint in which one closure portion overlies another closure portion so that the bond line of the adhesive is parallel, or substantially parallel, to the underlying surface. Thus the term includes bevelled lap, joggle lap, half lap and double lap joints as described in the Adhesives Handbook (Skeist). In addition the term includes so called scarf joints which are formed if the closure portions are tapered so that their thickness decreases in a direction away from the cover.

The present invention also provides a method of enclosing at least part of an elongate substrate which comprises:

positioning about the substrate a wrap-around device comprising a dimensionally-recoverable cover having an under surface and an outer surface and an adhesive closure arrangement comprising a first closure portion in the form of a flange-like projection extending away from the substrate, and a second closure portion having a first wall that extends away from the substrate and is bent or folded to form a second wall extending toward the substrate, one surface of the projection and/or of the second wall being coated with a layer of adhesive that will form a bond immediately the projection and second wall are brought into contact;

sliding one closure portion over the substrate toward the other closure portion to a position in which the closure portions abut each other and the projection and second wall are bonded by the adhesive, and causing the cover to recover and pull the closure portions in a direction away from each other until the first and second walls have opened out so that the closure portions are bonded together in the form of a lap joint.

When the wrap-around device in which the surface of the projection corresponding to the outer surface of the cover and/or the surface of the second wall corresponding to the under surface of the cover is/are coated with the adhesive, the method preferably includes the steps of:

lifting the second wall of the second closure portion back to expose the first wall to the flange-like projection after the device has been positioned about the substrate, sliding the flange-like projection over the substrate until it abuts the first wall of the second closure portion, adjusting the relative positions of the closure portions until they are correctly aligned, folding the second wall toward the substrate until it contacts the flange-like projection, and pressing the second wall and projection together to form the adhesive bond.

Since it is not necessary to lift one entire closure portion vertically over the other, the adhesive bond may be formed by bringing together only a short length of the closure portions at any instant while the unbonded lengths of the closure portions can rest on the substrate without contacting each other. The wrap-around device also has the advantage that pressure can be applied between the closure portions to bond them without the installer having to press the overlying closure portion downwardly onto the substrate. This is particularly important if the device is positioned about a transition in a pipe or the like, i.e. where the diameter of the pipe varies abruptly, since parts of the closure portions would not be resting on the substrate and so insufficient vertical force can be exerted on those parts without causing the device to deform and the closure portions to become incorrectly aligned.

As stated above, the cover of the device is dimensionally-recoverable. Dimensionally-recoverable articles are articles, the dimensional configuration of which may be made substantially to change by the appropriate treatment. Thus, for example, the cover may comprise an elastomeric material which is bonded to a layer of material that holds the elastomeric material in an extended configuration, and which will contract when the bond is broken. Examples of such articles are disclosed in U.S. Patent Specification No. 4,070,746 and U.K. Specification No. 2,018,527A, the disclosures of which are incorporated herein by reference. Preferably the cover is dimensionally heat-recoverable. Heat-recoverable articles may, for example, be produced by deforming a dimensionally heat-stable configuration to a dimensionally heat-unstable configuration, in which case the article will assume, or tend to assume, the original heat-stable configuration on the application of heat alone.

According to one method of producing a heat-recoverable article, a polymeric material is first extruded or moulded into a desired shape. The polymeric material is then cross-linked or given the properties of a cross-linked material by means of chemical cross-linking initiators or by exposure to high energy radiation, for example a high energy electron beam or atomic pile radiation. The cross-linked polymeric material is heated and deformed and then locked in the deformed condition by quenching or other suitable cooling methods. The deformed material will retain its shape almost indefinitely until exposed to a temperature above its crystalline melting temperature, for example about 120° C. in the case of polyethylene. Examples of heat-recoverable articles may be found in U.S. Patent Specification No. 2,027,962 and U.K. Patent Specification No. 990,235, the disclosures of which are incorporated herein by reference. As is made clear in U.S. Pat. No. 2,027,962, however, the original dimensionally stable heat-stable configuration may be a transient form in a continuous process in which, for example an extruded tube is expanded, whilst hot, to a dimensionally heat-unstable form.

Any polymeric material to which the property of dimensional recoverability may be imparted, may be used to form the cover. Preferably the cover comprises a polymeric material to which the property of dimensional recoverability has been imparted by crosslinking and deforming the material. Polymers which may be used to form the polymeric material include polyolefins such as polyethylene and ethylene copolymers for example with propylene, butene, vinyl acetate or ethyl acrylate, polyamides, polyurethanes, polyvinyl-chloride, polyvinylidene flouride, elastomeric materials such as those described in U.K. Specification No. 1,010,064 and blends such as those disclosed in U.K. Specifications Nos. 1,284,082 and 1,294,665, the disclosures of which are incorporated herein by reference. Preferably the cover is formed from a polyolefin or a blend of polyolefins, and especially it comprises polyethylene.

Any adhesive that will provide adhesion between the closure portions of the cover at the maximum temperature to which they are subjected during installation may be used in the device. Examples of such adhesives include pressure-sensitive adhesives, contact adhesives, hot-melt adhesives that have been rendered infusible by cross-linking, and, curable adhesives, preferably heat-curable adhesives. Preferably, however, the adhesive is one that will bond the appropriate parts of the closure portions together immediately they have been brought into contact, for example a pressure-sensitive or contact adhesive.

As pressure-sensitive adhesives, there may be mentioned rubber based acrylics or thermoplastics, styrene-butadiene or styrene-isoprene copolymers that contain tackifiers, e.g. hydrocarbon tackifiers, silicone adhesives and adhesives based on ethylene-vinyl acetate. If a contact adhesive is used, one based on chloroprene is preferred.

Examples of suitable crosslinked hot-melt adhesives are given in U.S. Pat. Specification No. 4,200,676, the disclosure of which is incorporated herein by reference. Preferably the adhesive has been crosslinked by irradiation, e.g. high energy electron or gamma irradiation, especially to the order of 10 Mrads.

If a heat-curable adhesive is used in the article according to the invention it preferably has a cure rate such that the gel time at 150° C., is not more than ten minutes, preferably not more than five minutes and especially not more than 2 minutes. Adhesives having a gel time at 25° C. that is not less than 200 hours, preferably not less than 500 hours, and especially not less than 2,000 hours are most preferred. The gel time of the adhesive is defined as the time taken for the torque value to increase to three times the initial value using a Monsanto Rheometer 100 oscillating disc rheometer.

The adhesive may be a heat-curable acrylic, silicone, polyester polyurethane or epoxy adhesive, for example in which the curing agent is rendered latent by microencapsulation.

The adhesive is preferably a one-part, heat-curable epoxy adhesive, which is advantageously cured by an amine, an acid anhydride, a carboxylic acid or a lewis acid curing agent.

Preferably, however, the adhesive, whether it is an epoxy adhesive or otherwise, is cured by an amine curing agent.

The curing agent of the adhesive may be rendered latent in known manner, for example by chemical means such as forming lewis acid (especially boron trifluoride) addition salts, quaternary ammonium salts, or by forming a complex of the curing agent with a transition metal or a b-metal, or by physical means such as retaining the curing agent in a different phase from the rest of the adhesive. Examples of latent curing systems are described in U.S. Patent Specifications Nos. 2,717,885, 2,962,453, 3,018,258, 3,397,156, 3,677,978, 3,678,007, and 3,956,241 and in German Offenlegungsschrift No. 1,904,641, the disclosures of which are incorporated herein be reference.

The curable adhesive is most preferably one which comprises reactive components (for example an epoxy resin and a curing agent therefor) that are solid at ambient temperatures and exist separately from each other in the form of particles. The particles are mixed together and are either pressed on the appropriate parts of the closure portions or are bound together by a binding agent e.g. a pressure sensitive adhesive. The components will not react together until the adhesive is heated sufficiently to melt the particles (preferably from 70° to 100° C.) whereupon the particles will coalesce and the adhesive will cure.

The adhesive is advantageously reinforced so that it will withstand any shear forces that may act on it when it is heated, for example at about 150° C. but before it has fully cured. The adhesive may be reinforced by incorporating up to 150% by weight preferably not more than 70% (based on the weight of the unreinforced adhesive) of a reinforcing filler, e.g. silica, or a natural or synthetic elastomer which is preferably cross-linked, e.g. a nitrile, acrylic or polyisobutylene rubber or a polyglycol ether-polyester elastomer. Alternatively, the adhesive may be reinforced by partially crosslinking it, for example, by irradiation (e.g. with high energy electrons) preferably to a level of up to 50 Mrad and especially to a level of from 5 to 10 Mrad, or, in the case of epoxy adhesives, by pre-reaction of some of the oxirane rings. The adhesive may be reinforced both by partial crosslinking and by incorporating a reinforcing filler (preferably an elastomer) prior to crosslinking. In addition to, or instead of, the above methods, the adhesive may be reinforced by providing it with mechanical reinforcing means, for example by incorporating a perforated reinforcing sheet, a fibre mat or cloth or a foam or sponge therein e.g. a glass fibre mat or cloth or an acrylic foam or sponge.

The under surface of the cover is preferably coated with a layer of sealant in order to bond the cover to the substrate and prevent ingress of moisture underneath the cover. Preferably the sealant comprises a hot-melt adhesive or a mastic. If the sealant comprises a hot-melt adhesive it may be desirable for the sealant to be separate from the cover in the region of one or both closure portions and extend from the cover in the form of a flap which lies on the substrate under the closure portions when they have been brought into abutment in order to provide a seal under the resulting lap joint.

In certain cases it may be desirable if, when the wrap-around device according to the invention is installed, only those parts of the cover that are not bonded together by the adhesive are recovered. Thus, for example, where it is necessary to heat the adhesive, it may be expedient for the parts of the closure portions to be bonded together by the adhesive, not to be dimensionally-recoverable (hereinafter referred to as "dimensionally stable" or, where appropriate "heat-stable"). This may be achieved by forming those parts of the closure portions from a material that is different from the rest of the cover. Alternatively, the dimensionally-stable parts may be fully recovered during manufacture of the article or the cover material forming those parts may be crosslinked to a level that renders them dimensionally stable.

In some instances it may be desirable for the abutted closure portions to be enclosed by a deformable "u"

shaped element, preferably a metal element, for example one formed from aluminium. The element can be used to help retain the closure portions together during recovery and/or to smooth out the heating of the closure portions, and will open out as the cover recovers to accommodate the change in configuration of the closure portions.

As indicated above, the adhesive may be a heat-curable adhesive, and especially a heat-curable epoxy adhesive. The device according to the invention is particularly suitable for use with a heat-curable adhesive since it is possible to arrange the closure portions as described above so that, when brought together, they form a ridge on the surface of the cover, which may be heated, e.g. by means of a gas torch or a hot-air gun, to cure the adhesive. This arrangement has the advantage that premature recovery of the cover which may be caused by inadvertent heating of the cover or heat conduction along the closure material, can be taken up by flattening of the closure portions and so will not put too great a strain on the adhesive before it has cured fully. In addition, the fact that the area of adhesive is located at the side of a ridge that projects above the rest of the cover enables the flame or hot air to be directed onto the adhesive containing parts of the closure portions but not onto the adjacent, heat-recoverable, region of the closure. The ridge will also shield the heat-recoverable region of the cover on the side of the ridge remote from the heating device from the flame or hot air.

Advantageously one closure portion has a fusible element that will melt during heating of the cover. This is especially useful if the adhesive is a heat-curable adhesive since this can be used to provide some indication that the adhesive has been heated sufficiently to form at least a temporary bond. In this case, at least one closure portion is advantageously held in its initial configuration by the fusible element, the arrangement being such that the element will melt only when the adhesive has received sufficient heat to form at least a temporary bond, preferably a permanent bond. Such an arrangement can be used to ensure that the cover will not be heated until the adhesive bond will withstand the full recovery forces of the cover, although it may be necessary to heat the closure portions after recovery of the cover to provide a permanent bond.

Where the element will melt only when the adhesive has received sufficient heat to form a permanent closure (which, in the case of many heat-curable adhesives, will occur before the curing reaction is complete) this can be used to indicate that a permanent bond has been formed. For example, where the closure portions form "upwardly" extending flange-like projections as described above, the fusible element may be arranged to hold the second closure portion in the form of a flange like projection. Since some recovery of the cover will occur as the adhesive is heated, the flange-like projection will begin to flatten when the element has melted, and so indicate that the adhesive has been sufficiently heated.

Preferably the fusible element comprises a hot-melt adhesive. This has the advantage that the hot-melt adhesive will, once it has melted, provide a secure bond between the device and the underlying substrate in the region of the closure portions. In the arrangement described above, the hot melt adhesive is advantageously located between the two walls forming the flange-like projection of the second closure portion.

Examples of hot-melt adhesives that may be used as the fusible element or as the sealant include those based on polyamides, vinyl and acrylic homo- and copolymers, such as ethylene-vinyl acetate and ethylene-ethyl acrylate copolymers, polyesters and polyolefins. Care should be taken to match the type of hot-melt adhesive with the material of the closure portion used so that adequate bonding is obtained. Thus, for example, when a polyolefin is used as the material, an ethylene-vinyl acetate adhesive is suitable. Similarly, where the material for the cover is based on a segmented polyester, for example, as commercially available under the trade name "Hytrel" from DuPont, a polyester hot-melt adhesive is preferred.

The cover may be provided, either before or during installation, with an element of higher thermal conductivity than that of the cover, preferably a metal element in sheet form, that is located about the closure portions in order to increase the conduction of heat thereto. The element may, for example, be in the form of a U-shaped patch positioned about both closure portions which will open out as the closure portions change in configuration to form a lap joint. Preferably, however, the element is arranged so that, when the closure portions have been brought together, the element extends from the external surface of the closure portions where it can be heated directly by a heating device, to the adhesive, to increase the rate at which the adhesive can be heated without the risk of damaging any material from which the closure portions are formed. The element may be in the form of a sheet than can be unfenestrated but which is perferably fenestrated, at least where it passes through the adhesive, to allow the adhesive to extend through it from one closure portion to the other, or in the form of a grid, gauze, or a fibre mat or cloth. Advantageously the thermally conductive element extends through and beyond the adhesive into the fusible element if present so that it promotes melting of the fusible element by heat conduction while ensuring that the adhesive has been heated sufficiently.

The wrap-around device may be made by extruding a sheet of a cross-linkable polymer, cross-linking the polymer either by chemical cross-linking agents or, preferably, by irradiation, expanding the sheet longitudinally while hot and cooling the sheet in its expanded state. The sheet may then be cut to a length that is appropriate to its intended use, and the closure portions may be formed by heating and folding the transverse edge regions, and if desired, allowing those parts of the closure portions that will be bonded together to recover so that they become dimensionally heat-stable. A layer of adhesive may then be applied to the appropriate parts of the closure portions. If a fusible element is to be provided it may be inserted during or after formation of the closure portions. For example, where the fusible element is a hot-melt adhesive, a previously extruded length of the hot-melt adhesive may be heated for a short length of time so that its surface becomes tacky and it is then placed in position and allowed to cool so that it adheres to the closure portion.

BRIEF DESCRIPTION OF THE DRAWINGS

FIG. 1 is a perspective view, partly in section, of one form of device in accordance with the invention;

FIG. 2 shows part of the device shown in FIG. 1 during installation after the closure portions have been brought together;

FIG. 3 shows the device shown in FIGS. 1 and 2 when installed about a substrate;

FIG. 4 shows a second form of device according to the invention;

FIGS. 5 and 6 show a third form of device according to the invention before and during installation;

FIGS. 7 and 8 show a fourth form of device according to the invention before and during installation;

FIGS. 9 and 10 show a fifth form of device according to the invention before and during installation;

FIG. 11 shows a modification of the device shown in FIG. 4; and

FIGS. 12 and 13 show the device shown in FIG. 11 at various stages during installation.

DETAILED DESCRIPTION OF THE INVENTION

Referring to FIGS. 1 to 3 of the accompanying drawings a wrap-around device for enclosing part of an elongate substrate 1, for example a pipe, comprises a cover 2 having two opposite closure portions 3 and 4. The cover is formed from a polymeric material that has been rendered dimensionally heat recoverable by crosslinking followed by expansion, when hot, in a direction perpendicular to the closure portions 3 and 4 and subsequent quenching in its expanded state.

The closure portion 3 is in the form of a dimensionally heat-stable flange-like projection extending away from the under surface 5 of the cover 2, and is provided with a layer 6 of a pressure-sensitive adhesive on the surface of the projection corresponding to the under surface 5 of the cover. The other closure portion 4 is also in the form of a flange-like projection having a heat-recoverable wall 7 and a heat-stable wall 8. The surface of the wall 8 facing the closure portion 3 corresponds to the outer surface 9 of the cover and is provided with a layer 10 of the same pressure sensitive adhesive as for the layer 6.

When the cover has been positioned about the substrate 1 one or each closure portion is moved along the surface of the substrate toward the other closure portion until they abut each other as shown in FIG. 2. The two closure portions 3 and 4 are then bonded together by means of the adhesive layers 6 and 10 in a plane that extends outwardly from the substrate. Installation of the device may then be completed by heating the cover, for example, by means of a gas torch, so that it contracts. As the cover contracts, the lower edges of the closure portion 3 and the wall 7 of the closure portion 4 are pulled away from each other until the ridge formed by the closure portion flattens and the edge portion 3 overlies the closure portion 4 as shown in FIG. 3.

The under surface 5 of the cover is advantageously provided with a sealant which may for example be an adhesive (preferably a hot-melt adhesive) or a mastic. The sealant may contain one or more corrosion inhibitors for example as described in U.K. Specification No. 2,023,021A, for preventing corrosion of the substrate.

FIG. 4 shows part of a device that is similar to the one shown in FIGS. 1 to 3, during installation immediately before the two closure portions 3 and 4 are brought into contact. The closure portions 3 and 4 are provided with layers 6 and 10 of a heat-curable adhesive preferably having a cure half life of not more than ten minutes at 150° C., and the inner surfaces of walls 7 and 8 of the edge portion 4 are bonded to a reservoir of hot-melt adhesive 11 that retains the edge portion 4 from opening out.

Although the adhesive of the layers 6 and 10 will not form a permanent bond until it is heated to its cure temperature, it is possible to formulate the adhesive so that it has sufficient tack at ambient temperatures temporarily to bond the closure portions 3 and 4 together, or instead, one or both layers 6 and 10 may be heated by a gas torch to render them tacky before the closure portions are brought together. Once the closure portions have been brought together, the heat-curable adhesive can be heated by directing the flame of a gas torch onto the outer surface of the closure portion 3. The heat from the torch will be conducted through the closure portion 3, the layers 6 and 10 of adhesive, and the wall 8 of the edge portion 4 before it reaches the hot-melt adhesive 11. By the time the hot-melt adhesive 11 has softened or melted the heat curable adhesive will have cured sufficiently to allow the cover to be recovered. In addition, the regions of the cover adjacent to the closure portions will have received sufficient heat to begin to contract and cause the ridge formed by the closure portions 3 and 4 to flatten. The flattening of the ridge can be used to indicate that the heat-curable adhesive has been heated sufficiently.

FIGS. 5 and 6 show part of another device before and during installation. This form of device is similar to that shown in FIGS. 1 to 3 but differs from that device in that the closure portion 3, which may be dimensionally heat-recoverable or heat stable, is coated with a layer of contact or pressure-sensitive adhesive 13 on the surface corresponding to the outer surface of the cover 2, i.e. the surface directed away from the other closure portion 4, and the surface 14 thereof corresponding to the under surface of the cover 2 is not provided with adhesive.

The other closure portion 4 has a first wall 7 extending from the cover 2 away from the substrate and is folded back on itself at the apex of the closure portion 4 to form a second wall 8, which may be heat-recoverable or heat-stable, and extends toward the substrate. The surface of the second wall 8 corresponding to the under surface of the cover is coated with a layer of contact or pressure sensitive adhesive 12.

In order to complete installation of the device, the second wall 8 of the closure portion 4 is pulled back and the closure portion 3 is moved along the substrate until it abuts the wall 7 of the closure portion 4. After ensuring that the closure portions are correctly positioned with respect to each other, the second wall 8 is returned to its original position and pressed against the closure portion 3 to bond the two closure portions together. The cover is then heated so that it contracts and causes the closure portions 3 and 4 to form a lap joint with the second wall 8 of closure portion 4 overlying the closure portion 3. This arrangement has the advantage that recovery of the cover will pull the base of the closure portion 3 toward the lower edge of the wall 8 and so reduce any tendency for the adhesive bond to peel open at that point.

FIGS. 7 and 8 show a form of device that is similar to that shown in FIGS. 5 and 6 but includes a layer of sealant 20 comprising a hot-melt adhesive that is bonded to the under surface of the cover 2. The sealant 20 extends beyond the edge of the cover 2 and the first wall 7 of the closure portion 4 in the form of a separate flap 21 so that, when the closure portions are brought together as shown in FIG. 8 the flap 21 lies on the substrate beneath the closure portions 3 and 4. Heating of the device in order to recover the cover 2 about the substrate will cause the hot-melt adhesive 20 to melt or soften and provide a seal between the cover and the substrate in the region of the resulting lap joint in addition to the other parts of the cover.

FIGS. 9 and 10 show part of another device during installation. In this device the closure portion 4 contains a reservoir of hot-melt adhesive 11 which is bonded to the wall 7 of the closure portion 4 but not bonded to the wall 8. The surface of the wall 8 facing the hot-melt adhesive 11 is coated with a layer 12 of heat-curable adhesive and the surface of the closure portion 3 facing away from the closure portion 4 is also coated with a layer 13 of the same heat-curable adhesive.

When the cover has been positioned about the substrate 1, the wall 8 is pulled back to expose the hot melt adhesive 11 to the closure portion 3, and the closure portion 3 is moved toward the closure portion 4 until it abuts the hot-melt adhesive 11. The wall 8 is then folded down and pressed against the closure portion 3 so that the layers 12 and 13 are brought into contact and retained together by their tack. The arrangement is then heated by a gas torch directed onto the outer surface of the wall 8 in order to cure the heat-curable adhesive and melt the hot-melt adhesive 11. When the hot-melt adhesive has melted, the cover can be recovered fully and the closure portions will flatten.

FIGS. 11 to 13 show part of a further device during installation. The device is similar to that shown in FIG. 4 but has been modified by providing the closure portion 4 with a perforated aluminium sheet 14 for conducting heat from the gas torch to the heat-curable adhesive and the hot-melt adhesive 11. One end 15 of the sheet 14 is embedded in the hot-melt adhesive, and the sheet extends round the lower edge of the wall 8, along the outer surface of the wall 8 where it is embedded in the layer 10 of heat-curable adhesive, and is then bent back over the apex of the closure portion 4. Preferably the aluminium sheet is provided with a line of weakness in the region of the apex of the closure portion 4 in order to allow removal of the free end of the sheet 14 after installation.

When the closure portion 3 has been brought into contact with the closure portion 4, the free end of the aluminium sheet can be folded over the closure portion 3 as shown in FIG. 10 and then heated by means of a gas torch. The aluminium sheet can be used to hold the closure portions 3 and 4 together before heating if the heat-curable adhesive has a low degree of tack at ambient temperatures, and the sheet will, on heating, conduct heat through the bond line of the heat curable adhesive and into the hot melt adhesive.

After the closure portions have flattened, the cover can be heated to cause recovery. When the cover has been completely recovered about the substrate the free end of the aluminium sheet 14 can be peeled away along the line of weakness to form a final closure as shown in FIG. 13.

I claim:

1. A wraparound device for enclosing at least part of an elongate substrate, comprising:

a dimensionally-recoverable cover having an adhesive closure arrangement comprising two closure portions which can be brought into abutment to form an adhesive bond, wherein the adhesive bond is formed by a heat-curable adhesive and after the bond is formed, changes in configuration to form a lap joint by recovery of the cover about the substrate; and an element of higher thermal conductivity than that of the cover, the element being so arranged that, when the closure portions have been brought together the element extends from an external surface of either of the closure portions so as to be capable of conducting heat to the heat-curable adhesive.

2. A device as claimed in claim 1 wherein the cover has an under surface to be positioned about the substrate and an outer surface;

wherein the closure portions form a single adhesive bond between them;

wherein a first of the closure portions is in the form of a flange-like projection extending away from the substrate;

wherein a second of the closure portions has a first wall that extends from the cover away from the substrate and is bent to form a second wall extending toward the substrate; and wherein at least the outer surface of the flange-like projection includes a layer of the adhesive and forms with the under surface of the cover to form the single bond.

3. A device as claimed in claim 2 wherein the under surface of the flange-like projection is free of adhesive.

4. A device as claimed in claim 2, wherein the under surface of the cover is provided with a layer of sealant.

5. A device as claimed in claim 4, wherein the sealant comprises a hot-melt adhesive.

6. A device as claimed in claim 5, wherein the sealant is separate from the cover in the region of at least one closure portion and extends from the cover in the form of a flap which, when the closure portions have been brought into abutment, lies on the substrate under the closure portions.

7. A device as claimed in 1, wherein that part of each of the closure portions which are bonded together are dimensionally-stable.

8. A device as claimed in claim 2, wherein the flange-like projection and the second wall are dimensionally-stable.

9. A device as claimed in claim 1, wherein the cover is dimensionally heat-recoverable.

10. A device as claimed in claim 1 which includes a fusible element that will retain at least one of the closure portions in its initial configuration until the adhesive bond has received sufficient heat to begin to cure.

11. A substrate, at least part of which has been enclosed by recovering thereon a wrap-around device as claimed in claim 1.

12. A substrate as claimed in claim 11 which is a pipe.

* * * * *